United States Patent [19]

Park

[11] Patent Number: 5,691,609
[45] Date of Patent: Nov. 25, 1997

[54] POWER SUPPLY FOR A RASTER CENTER CONTROLLER FOR A VIDEO DISPLAY APPLIANCE

[75] Inventor: Kwang Ho Park, Kyoungsangbuk-Do, Rep. of Korea

[73] Assignee: LG Electronics Inc., Seoul, Rep. of Korea

[21] Appl. No.: 673,575

[22] Filed: Jul. 1, 1996

[30] Foreign Application Priority Data

Jul. 7, 1995 [KR] Rep. of Korea .................... P95-20019

[51] Int. Cl.$^6$ ............................. G09G 1/04; H01J 29/70
[52] U.S. Cl. ............................. 315/398; 315/411
[58] Field of Search ............................. 315/411, 398

[56] References Cited

U.S. PATENT DOCUMENTS

| | | | |
|---|---|---|---|
| 3,814,981 | 6/1974 | Rusk | 315/398 |
| 3,965,391 | 6/1976 | Lister | 315/408 |
| 4,635,176 | 1/1987 | Hishiki et al. | 315/411 |

FOREIGN PATENT DOCUMENTS

| | | |
|---|---|---|
| 1475331 | 10/1974 | United Kingdom . |
| 2222058 | 7/1989 | United Kingdom . |

Primary Examiner—Gregory C. Issing
Attorney, Agent, or Firm—Oppenheimer Poms Smith

[57] ABSTRACT

A power supply for a raster center controller for a video display appliance which can prevent picture movement phenomena of a cathode ray tube which are caused by unstable power supply to the raster center controller due to the change of the horizontal frequency. The power supply for a raster center controller includes coils, provided in a secondary winding of a flyback transformer, for generating and providing to the raster center controller a pulse voltage having a pulse width corresponding to that of a high voltage developed in the flyback transformer, first and second power supply sections, coupled between the coils and the raster center controller, for providing positive and negative supply voltages to the raster center controller by rectifying and performing charge/discharge operation with respect to the pulse voltage developed in the coils, respectively.

3 Claims, 3 Drawing Sheets

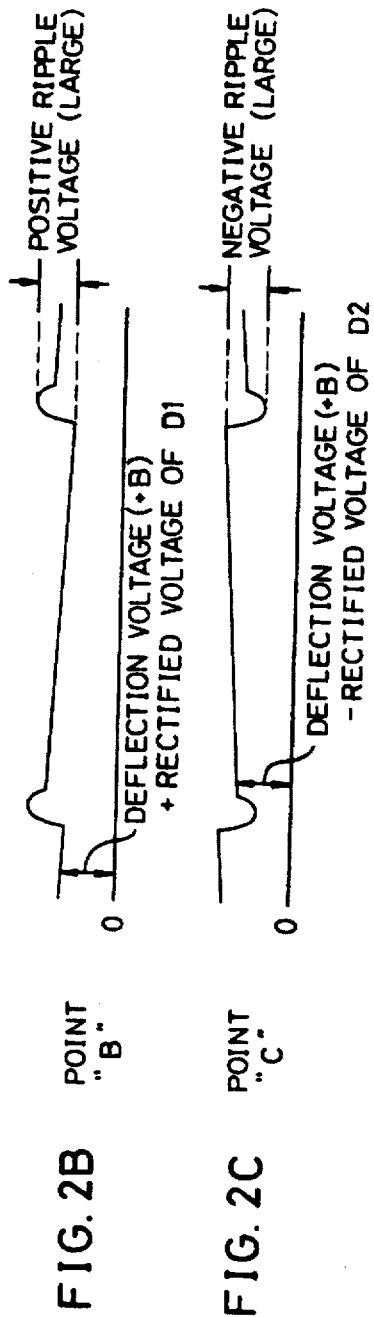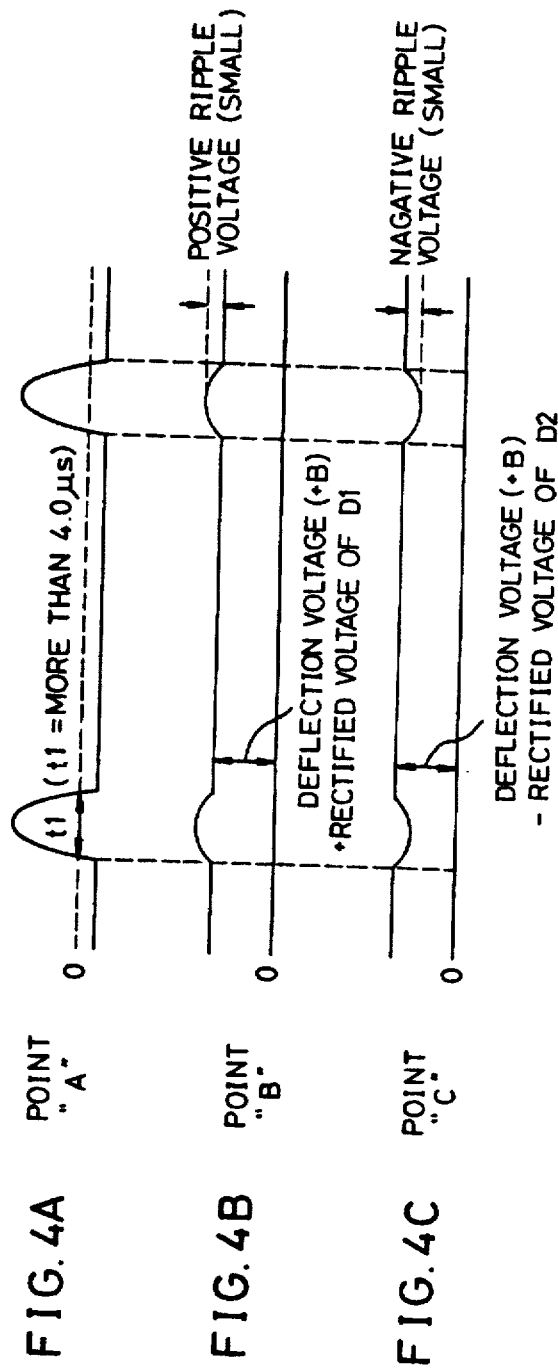

POWER SUPPLY FOR A RASTER CENTER CONTROLLER FOR A VIDEO DISPLAY APPLIANCE

BACKGROUND OF THE INVENTION

1. Field of the Invention

The present invention relates to a power supply for a raster center controller for a video display appliance having a deflection type cathode ray tube. In particular, the present invention relates to a power supply for a raster center controller for a video display appliance which can prevent picture movement phenomena of a cathode ray tube which are caused by an unstable power supply to the raster center controller due to a change of a horizontal frequency.

2. Description of the Prior Art

A conventional power supply for a raster center controller for a video display appliance is shown in FIG. 1. Referring to FIG. 1, the conventional power supply for a raster center controller is provided with a deflection section 1 for generating a pulse signal for controlling a horizontal deflection coil HDY1 in response to an input horizontal signal, a transformer T1 composed of coils L1, L2, and L3 for generating a predetermined voltage in response to the pulse signal inputted from the deflection section 1 and an input deflection voltage +B, a diode D1, coupled to the secondary coils L2 and L3 of the transformer T1 the center tap of which is coupled to the deflection voltage +B, for rectifying the voltage developed in the secondary coil L2 and providing a positive voltage higher than the deflection voltage +B, a capacitor C1 for being charged and discharged with the positive voltage rectified by and provided from the diode D1, a diode D2, coupled to the secondary coils L2 and L3 of the transformer T1 the center tap of which is coupled to the deflection voltage +B, for rectifying the voltage developed in the secondary coil L3 and providing a negative voltage lower than the deflection voltage +B, a capacitor C2 for being charged and discharged with the negative voltage rectified by and provided from the diode D2, and a raster center control section 2, the output of which is coupled to the horizontal deflection coil HDY1, for controlling a movement of a raster on a cathode ray tube in response to the positive and negative voltages provided via the capacitors C1 and C2, respectively.

The conventional power supply for a raster center controller is also provided with a high voltage generating section 3 for generating a high voltage pulse signal in response to the input horizontal signal, and a flyback transformer FBT1 driven by the high voltage pulse signal generated by the high voltage generating section 3.

In the drawing, the reference numeral C3 denotes a capacitor, and L5 and L6 denote coils of the flyback transformer.

The operation of the conventional power supply for a raster center controller as constructed above will now be explained.

As the input horizontal signal is applied to the deflection section 1 and the high voltage generating section 3, the high voltage generating section 3 generates and provides the high voltage pulse signal to the primary coil L5 of the flyback transformer FBT1. The flyback transformer FBT1 is driven by an input high supply voltage +B and the high voltage pulse signal provided from the high voltage generating section 3, and develops on its secondary coil L6 a high voltage output for driving the cathode ray tube.

At the same time, by the input of the horizontal signal, the deflection section 1 generates and outputs the pulse signal to the horizontal deflection coil HDY1 and to the transformer T1, so that a pulse voltage is developed in the secondary coils L2 and L3 of the transformer T1. At this time, the deflection voltage +B is applied to the primary coil L1 and the center tap of the secondary coils L2 and L3 of the transformer T1.

The pulse voltage developed in the secondary coil L2 is rectified by the diode D1, and the rectified voltage is provided to the capacitor C1, resulting in that the positive voltage which is higher than the deflection voltage +B charges the capacitor C1 as shown in FIG. 2B.

Also, the pulse voltage developed in the secondary coil L3 of the transformer T1 is rectified by the diode D2, and the rectified voltage is provided to the capacitor C2, resulting in that the negative voltage which is lower than the deflection voltage +B charges the capacitor C2 as shown in FIG. 2C.

The positive and negative voltages, which charge and discharge the capacitors C1 and C2, respectively, are supplied to the raster center control section 2, and thus the raster center control section 2 supplies its output voltage to the horizontal deflection coil HDY1 coupled to the horizontal capacitor C3 so as to control the raster on the cathode ray tube to move to its regular position.

However, the conventional power supply for a raster center controller for a video display appliance as described above has the drawbacks in that a separate transformer T1 should be employed to provide a power supply to the raster center control section 2, and the diodes D1 and D2 for rectifying the small pulses should have a high operative reliability. Specifically, since the period of the output pulses of the deflection section 1 for driving the horizontal deflection coil HDY1 is very small (i.e., less than about 2.5 µs), pulse-type ripples are greatly generated during the rectifying operation, and this causes the operation of the raster center control section to become unstable in response to the variation of the input horizontal frequency.

SUMMARY OF THE INVENTION

It is an object of the present invention to solve the problems involved in the prior art, and to provide a power supply for a raster center controller for a video display appliance which can prevent the picture movement phenomena of a cathode ray tube by improving the instability of the power supply for the raster center controller due to the change of the horizontal frequency.

It is another object of the present invention to provide a power supply for a raster center controller for a video display appliance which can reduce the manufacturing cost by providing the power supply to the raster center controller using the internal winding of a flyback transformer, not using a separate transformer.

In order to achieve the above objects, the present invention provides a power supply for a raster center controller for a video display appliance having a flyback transformer for generating a high voltage for driving a cathode ray tube, and a raster center controller, coupled to a horizontal deflection coil, for controlling movement of a raster on said cathode ray tube, said power supply comprising:

coil means, provided in a secondary winding of said flyback transformer, for generating and providing to said raster center controller a pulse voltage signal having a pulse width which corresponds to a pulse width of said high voltage developed in said flyback transformer;

a first power supply means, coupled between said coil means and said raster center controller, for receiving said pulse voltage signal developed in said coil means and providing a positive supply voltage to said raster center controller; and a second power supply means, coupled between said coil means and said raster center controller, for receiving said pulse voltage signal developed in said coil means and providing a negative supply voltage to said raster center controller.

In the present invention, it is preferable that said first power supply means comprises a diode for rectifying said pulse voltage signal developed in said coil means and providing said positive supply voltage higher than a deflection voltage which is inputted to a center tap of said coil means; and a capacitor which is charged and discharged with said positive supply voltage provided from said diode.

It is also preferable that said second power supply means comprises a diode for rectifying said pulse voltage signal developed in said coil means and providing said negative supply voltage lower than a deflection voltage which is inputted to a center tap of said coil means; and a capacitor which is charged and discharged with said negative supply voltage provided from said diode.

BRIEF DESCRIPTION OF THE DRAWINGS

The above object, other features and advantages of the present invention will become more apparent by describing the preferred embodiment thereof with reference to the accompanying drawings, in which:

FIG. 2A is a waveform diagram of the pulse signal generated in the deflection section in FIG. 1.

FIG. 2B is a waveform diagram explaining the relationship between the positive voltage generated by the transformer in FIG. 2 and the deflection voltage +B.

FIG. 2C is a wave form diagram explaining the relationship between the negative voltage generated by the transformer in FIG. 1 and the deflection voltage +B.

FIG. 4A is a waveform diagram of the pulse signal generated in the high voltage generating section in FIG. 3.

FIG. 4B is a waveform diagram explaining the relationship between the positive voltage generated by the flyback transformer in FIG. 3 and the deflection voltage +B.

FIG. 4C is a waveform diagram explaining the relationship between the negative voltage generated by the flyback transformer in FIG. 3 and the deflection voltage +B.

DETAILED DESCRIPTION OF THE PREFERRED EMBODIMENT

Figure 1:
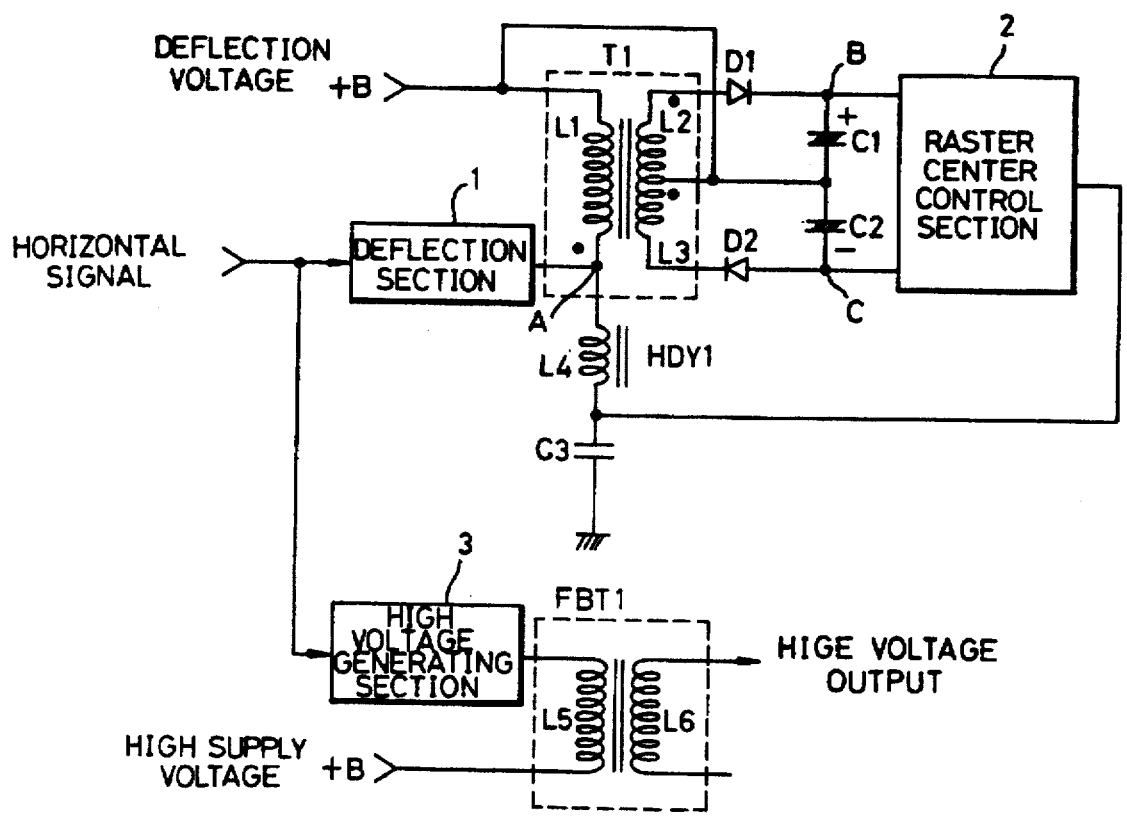
FIG. 1 is a schematic circuit diagram of a conventional power supply for a raster center controller for a video display appliance.
Figure 3:
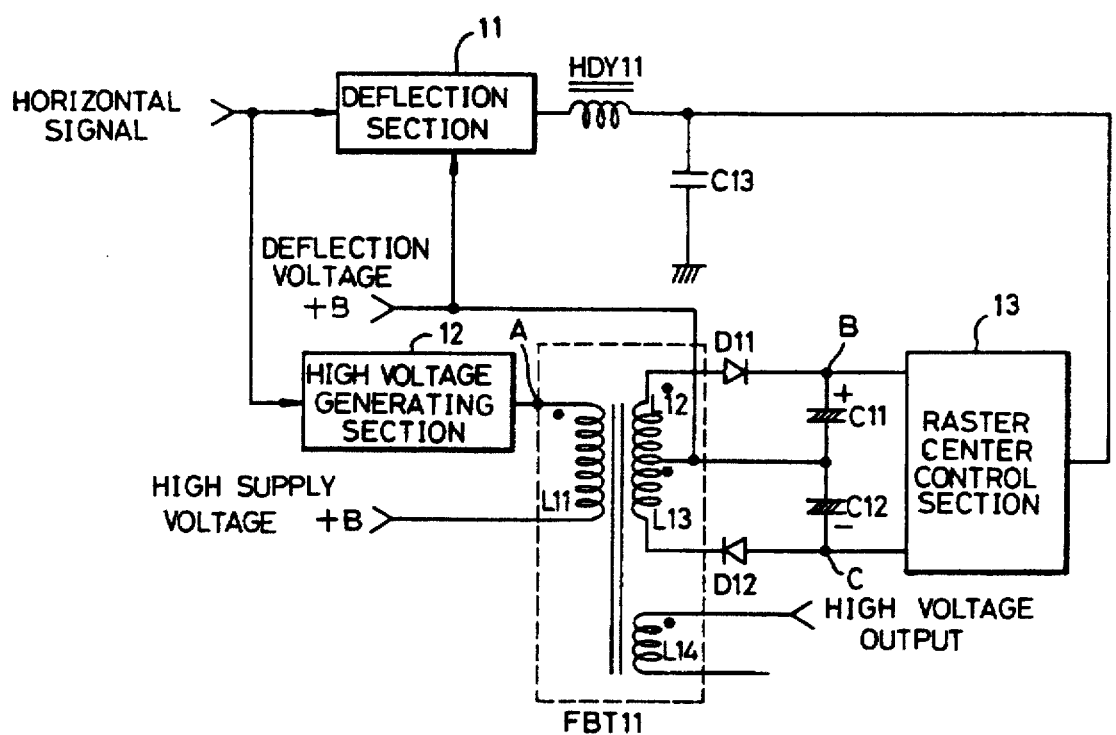
FIG. 3 is a schematic circuit diagram of the power supply for a raster center controller for a video display appliance according to the present invention.

FIG. 3 is a circuit diagram of the power supply for a raster center controller for a video display appliance according to the present invention, and FIGS. 3A to 3C are waveform diagrams explaining the operation of the power supply for a raster center controller according to the present invention.

Referring to FIG. 3, the power supply for a raster center controller according to the present invention is provided with a deflection section 11 for generating a pulse signal for driving a horizontal deflection coil HDY11 in response to an input horizontal signal, a high voltage generating section 12 for generating a high voltage pulse signal in response to the input horizontal signal, and a flyback transformer FBT11 for generating a high voltage output for driving a cathode ray tube in accordance with the high voltage pulse signal generated by the high voltage generating section 12.

The power supply for a raster center controller according to the present invention is also provided with coils L12 and L13, provided in a secondary winding of the flyback transformer FBT11, for generating a pulse voltage to be provided to a raster center control section 13 for controlling the raster's movement on the cathode ray tube; a first power supply section composed of a diode D11 for rectifying the pulse voltage developed in the coil L12, and providing a positive supply voltage higher than the deflection voltage +B which is inputted to the center tap of the coil L12, and a capacitor C11 for being charged and discharged with the positive supply voltage provided from the diode D11; and a second power supply section composed of a diode D12 for rectifying the pulse voltage developed in the coil L13, and providing a negative supply voltage lower than the deflection voltage +B which is inputted to the center tap of the coil L13, and a capacitor C12 for being charged and discharged with the negative supply voltage provided from the diode D12.

The positive and negative supply voltages which charge and discharge the capacitors C11 and C12, respectively, are supplied to the raster center control section 13 for controlling the raster's movement on the cathode ray tube as the power supply of the raster center control section 13.

In the drawing, the reference numeral C13 denotes a capacitor, and L15 denotes a coil.

Now, the operation of the power supply for a raster center controller according to the present invention as described above will be explained with reference to FIGS. 3, 4A to 4C.

When the horizontal signal is inputted to the deflection section 11 and the high voltage generating section 12, the deflection section 11 generates and outputs the pulse signal to the horizontal deflection coil HDY11 in response to the horizontal signal and the input deflection voltage +B. The horizontal deflection coil HDY11 is driven by the pulse signal provided from the deflection section 11.

At the same time, as the horizontal signal is also inputted to the high voltage generating section 12, the high voltage generating section 12 generates and provides the high voltage pulse signal to the flyback transformer FBT11, and thus the high voltage output for driving the cathode ray tube is developed in the primary coil L11 and the secondary coil L14 of the flyback transformer FBT11.

Specifically, the flyback transformer FBT11 is driven by the pulse signal provided from the high voltage generating section 12 as shown in FIG. 4A, and thus a high voltage pulse signal is developed in the secondary coils L12 and L13 of the flyback transformer FBT11 in response to the deflection voltage +B coupled to the center tap of the coils L12 and L13.

The pulse voltage developed in the secondary coil L12 is rectified by the diode D11, and the rectified voltage is provided to the capacitor C11, causing the capacitor C11 to be charged with the positive supply voltage which is higher than the deflection voltage +B as shown in FIG. 4B.

Also, the pulse voltage developed in the secondary coil L13 is rectified by the diode D12, and the rectified voltage is provided to the capacitor C12, causing the capacitor C12 to be charged with the negative supply voltage which is lower than the deflection voltage +B as shown in FIG. 4C.

The positive and negative voltages, which charge and discharge the capacitors C1 and C2, respectively, are supplied to the raster center control section 13, and thus the raster center control section 13 supplies its output voltage to the horizontal deflection coil HDY11 so as to control the raster on the cathode ray tube to move to its regular position.

From the foregoing, it will be apparent that the power supply for a raster center controller according to the present invention provides the advantages in that since the period of the output pulses is relatively long (more than about 4.5 μs), causing the on-time of the pulses to be of sufficient duration, pulse-type ripples of a smaller size are generated during the rectifying operation, and thus the raster center control section operates stably even though the horizontal frequency is varied. Further, according to the present invention, since the internal winding of the flyback transformer is used, instead of employing a separate transformer, the manufacturing cost can be reduced as well as the reliability of the rectifying diodes can be improved.

While the present invention has been described and illustrated herein with reference to the preferred embodiment thereof, it will be understood by those skilled in the art that various changes in form and details may be made therein without departing from the spirit and scope of the invention.

What is claimed is:

1. A power supply for a raster center controller for a video display appliance having a flyback transformer for generating a high voltage for driving a cathode ray tube, and a raster center controller, coupled to a horizontal deflection coil, for controlling movement of a raster on said cathode ray tube, said power supply comprising:

coil means, provided in a secondary winding of said flyback transformer, for generating and providing to said raster center controller a pulse voltage signal having a pulse width which corresponds to a pulse width of said high voltage developed in said flyback transformer;

a first power supply means, coupled between said coil means and said raster center controller, for receiving said pulse voltage signal developed in said coil means and providing a positive supply voltage to said raster center controller; and a second power supply means, coupled between said coil means and said raster center controller, for receiving said pulse voltage signal developed in said coil means and providing a negative supply voltage to said raster center controller.

2. A power supply for a raster center controller as claimed in claim 1, wherein said first power supply means comprises:

a diode for rectifying said pulse voltage signal developed in said coil means, and providing said positive supply voltage higher than a deflection voltage which is inputted to a center tap of said coil means; and a capacitor which is charged and discharged with said positive supply voltage provided from said diode.

3. A power supply for a raster center controller as claimed in claim 1, wherein said second power supply means comprises:

a diode for rectifying said pulse voltage signal developed in said coil means and providing said negative supply voltage lower than a deflection voltage which is inputted to a center tap of said coil means; and a capacitor which is charged and discharged with said negative supply voltage provided from said diode.

\* \* \* \* \*